United States Patent [19]

Brain et al.

[11] Patent Number: 5,503,863
[45] Date of Patent: Apr. 2, 1996

[54] NON-FAT FOODS AND METHODS FOR PREPARING SAME

[75] Inventors: Charles H. Brain, Wooster; Karen S. Gaither; David J. Muenz, both of Akron, all of Ohio

[73] Assignee: The J. M. Smucker Company, Orrville, Ohio

[21] Appl. No.: 488,686

[22] Filed: Jun. 7, 1995

Related U.S. Application Data

[60] Division of Ser. No. 115,825, Sep. 3, 1993, Pat. No. 5,451,420, which is a continuation-in-part of Ser. No. 857,257, Mar. 25, 1992, Pat. No. 5,260,083.

[51] Int. Cl.$^6$ .................. A23L 1/29; A23L 1/39; A23L 2/02
[52] U.S. Cl. .............. 426/573; 426/589; 426/615; 426/599; 426/639; 426/804
[58] Field of Search .................. 426/573, 589, 426/599, 615, 639

[56] References Cited

U.S. PATENT DOCUMENTS

| | | | |
|---|---|---|---|
| 3,615,645 | 10/1971 | Forkner | 426/573 |
| 3,947,604 | 3/1976 | McGinley | 426/573 |
| 4,562,080 | 12/1985 | Tenn | 426/94 |
| 4,623,542 | 11/1986 | Wallin et al. | 426/94 |
| 4,830,787 | 5/1989 | Klemann et al. | 426/804 |
| 4,915,974 | 4/1990 | D'Amelia et al. | 426/611 |
| 4,957,764 | 9/1990 | Okonogi et al. | 426/573 |
| 4,985,270 | 1/1991 | Singer | 426/515 |
| 4,988,527 | 1/1991 | Buckholz et al. | 426/536 |
| 5,000,974 | 3/1991 | Albersmann | 426/564 |
| 5,011,701 | 4/1991 | Baer et al. | 426/573 |
| 5,019,414 | 5/1991 | Valdes | 426/573 |
| 5,034,242 | 7/1991 | Lasdon et al. | 426/633 |
| 5,063,075 | 11/1991 | Yarger | 426/601 |
| 5,064,678 | 11/1991 | Klemann et al. | 426/611 |
| 5,100,687 | 3/1992 | Pointer | 426/573 |
| 5,213,834 | 5/1993 | Ikeda et al. | 426/573 |
| 5,260,083 | 11/1993 | Brain et al. | 426/573 |

*Primary Examiner*—Jeanette Hunter
*Attorney, Agent, or Firm*—Vickers, Daniels & Young

[57] ABSTRACT

Non-fat food including fruit spreads, bakery fillings, flavored syrups, fruit and vegetable juices, pie glazes and fillings, yogurt fillings and salsa, for example, are prepared by incorporating a pectin, starch, cellulose, or protein based fat mimetic, or mixtures thereof, into a recipe therefor as an additional ingredient.

37 Claims, No Drawings

NON-FAT FOODS AND METHODS FOR PREPARING SAME

This application is a division of Ser. No 115,825, filed Sep. 3, 1993, now U.S. Pat. No. 5,451,420, which is a continuation-in-part application of Ser. No. 857,257, filed Mar. 25, 1992, now U.S. Pat. No. 5,260,083

BACKGROUND OF THE INVENTION

This invention relates to the art of foods and, more particularly, to non-fat food products including a fat mimetic as an additional ingredient rather than as a fat substitute.

As is well known, fat mimetics, are edible materials used as fat replacements in foods to reduce the calories in the foods without decreasing the palatability and flavor of the food. Fat mimetics are materials which are inherently of lower caloric value than the fats they replace. Therefore, the calorie intake in a food containing a fat mimetic as a replacement for fat is reduced relative to the same food with fat. At the same time, the fat mimetic retains the desirable physical and organoleptic characteristics of fat in the food to which it is added.

A number of fat mimetics for the latter purpose and/or food products containing fat substitutes or replacements are disclosed, for example, in U.S. Pat. Nos. 4,830,787 to Klemann et al; 4,915,974 to D'Amelia et al; 4,985,270 to Singer et al; 5,011,701 to Baer et al; 5,063,075 to Yarger et al; and, 5,064,678 to Klemann et al, the disclosures of which are incorporated herein by reference. These patents disclose a variety of materials and compositions useful in foods such as pie fillings, frozen dairy products, salad dressings, icings and the like to reduce the fat content of the food product while maintaining the physical and organoleptic characteristics of the food product which would be attained if the food were prepared with fat. In all of these patents, the fat mimetic is a substitute or replacement for fat in a food which normally contains fat. In addition to the foregoing patents, U.S. Pat. No. 4,988,527 to Buckholz et al discloses the use of sclareolide for enhancing the organoleptic properties of food stuff whereby, for example, the sweetness of a jelly resulting from the use of a non-nutritive sweetener such as aspartame is enhanced by mixing sclareolide with the non-nutritive sweetener, and U.S. Pat. No. 3,947,604 to McGinley et al discloses an edible jelly having improved spreadability and resistance to heat at baking temperatures by incorporating in the jelly recipe a small amount of a composition of beta-1, 4 glucan and sodium carboxymethyl cellulose. Neither sclareolide nor the composition disclosed in the patent to McGinley has the characteristics of a fat mimetic, namely the ability to mimic the smooth and creamy mouthfeel, texture and lubricity of fat, when incorporated into a food product.

SUMMARY OF THE INVENTION

We have discovered that the incorporation of fat mimetics into the recipes for non-fat food products, including for example fruit and vegetable based foods and syrups, as an additional ingredient rather than a fat substitute, provides new food products having improved texture relative to the same standard products without a fat mimetic. Furthermore, fat mimetics incorporated into certain fruit spread recipes enhance spreadability thereof and enhance the flavor and mouthfeel thereof which, we believe, results from a decreased dissipation rate for the fruit product in the mouth during consumption which, in turn, is due to the presence of the fat mimetic ingredient. Still further, bakery filling products in accordance with the invention have improved water retention and bake stability. The non-fat food products according to our invention are not fat imitation products but, rather, similar to traditional products with new and unique characteristics.

More particularly with regard to fruit spreads, it has been found that fruit spread recipes incorporating a fat mimetic selected from the group consisting of pectin, starch, and protein based fat mimetics, in appropriate amounts and introduced at the appropriate time in the preparation process, enable producing a new fruit spread having the improved texture and flavor characteristics referred to above. With respect to fruit spreads made with the foregoing fat mimetic ingredients, the cooking time is dependent on the desired soluble solids content for the end product, which preferably is between from 20% to 70% by weight, the cooking temperature is the same as that for standard jellies and jams, and the cooked mixture is hot filled into final containers, such as jars. With respect to the cooking temperature, cooking in the examples set forth hereinafter is in a vacuum kettle at about 160° F. which is standard with respect to high volume production. If cooking is achieved in an open vessel, the standard cooking temperature would be about 220° F. As with standard jellies and jams, a food acid can be added following cooking to adjust the pH, and optional ingredients such as dairy solids, flavors, bulking agents, and preservatives can be added before or after cooking, depending on the individual ingredient characteristics and requirements.

The preparation of fruit spreads incorporating either a pectin based fat mimetic or a starch based fat mimetic includes homogenization of the ingredients under high shear following cooking to microparticulate the product into a particle size of from about 5 to 100 microns and/or to form a particle gel with a particle aggregate size of from about 2 to 15 microns after which the mixture is hot filled into suitable containers.

More particularly with regard to bakery fillings, or bakery jelly, both bake stability and water retention are necessary in order to achieve a high quality product. Bake stability is the ability of the bakery jelly to resist melting or softening and spreading relative to a bakery product when exposed to a baking temperature such as 350° F. to 400° F. and, if the filling includes whole fruit or fruit puree, separation of the jelly therefrom. Water retention is the ability to minimize the transmitting of water from the filling or jelly into the bakery dough during baking. Generally, this characteristic is controlled by increasing the solids content of the bakery filling, whereby the amount of water available for transmission to the dough is reduced. The physical separation of water or moisture from the bakery filling for transmission to the bakery dough is called weeping and, while the amount of water available for transmission is reduced in the foregoing manner, weeping is still a problem with regard to the water that is available for transmission. It has been found that fruit spread recipes of the general character described above incorporating a fat mimetic selected from the group consisting of pectin, starch, and protein based fat mimetics, provide high bake stability bakery fillings when cooked to provide a soluble solids content between from 60% to 80% by weight. It has also been found that these recipes, as well as other bakery filling or bakery jelly recipes, incorporating a pectin or starch based fat mimetic and cooked to a soluble solids content of from 60% to 80% by weight and homogenized following cooking to microparticulate the product as mentioned above, provide a bakery filling which minimizes weeping of water into the bakery dough. In this respect, the individual microcells produced by homogenizing the cooked ingredients hold the water or moisture in the bakery filling to minimize seepage or weeping therefrom. In addition to the foregoing attributes, bakery fillings in accordance with the present invention also enjoy the improved flavor and mouth feel due to the presence of the fat mimetic ingredient.

It is of course well known that recipes for jams, jellies, fruit spreads and bakery fillings or bakery jellies include stabilizers such as pectins and starches as well as other hydrocollids which provide the desired solid texture for the final product which may be a soft or tough gel. It is to be noted at this point in connection with the present invention that while the pectin and starch based fat mimetics and corresponding system stabilizers are both generically termed, such generic classification is from a purely chemical standpoint, and the stabilizer and fat mimetic ingredients function in vastly different ways when formulated as part of a food product in accordance with the invention. In this respect, the pectin, starch and protein based fat mimetic materials used in the examples set forth hereinafter for producing fruit spreads, bakery fillings and the like, will not alone produce an acceptable texture or body for the end product. Products formulated with a fat mimetic alone would possess a creamy, smooth mouthfeel, but would have a very thin, pourable consistency and, therefore, would not be acceptable as a fruit spread, bakery jelly or the like. An additional ingredient is necessary to serve as a general system stabilizer in order to obtain the desired gel or consistency. Moreover, the pectin, starch and protein based fat mimetics are physically very different from general system stabilizers. In this respect, each of the fat mimetic materials is in suspension within the fruit product while the system stabilizer is almost fully solubilized and virtually indistinguishable from the surrounding fruit product. Thus, it is possible to physically separate the suspended fat mimetic materials from the fruit product through the use of a centrifuge, while it is impossible to physically separate a solubilized system stabilizer in this manner.

In addition to fruit spreads and bakery fillings as referred to hereinabove, it has been found that improved characteristics including texture, flavor and/or mouth feel are obtained by incorporating fat mimetics as an extra ingredient in recipes for other non-fat food products including, for example fruit and vegetable based or flavored foods and syrups.

The following examples are presented to further illustrate and explain the invention and should not be taken as limiting in any regard. Unless stated otherwise, all percentages are by weight and are based on the weights of the ingredients in the formulations after cooking to a desired soluble solids content for the final product.

EXAMPLE I

A fruit spread is prepared using a pectin based fat mimetic and in particular a fat mimetic marketed by Hercules, Inc. under the trade name Slendid. The pectin in Slendid is a low methoxyl pectin. This fat mimetic is a powder which, in connection with its intended use as a fat substitute is mixed with water and calcium chloride and is homogenized under high shear to make a solution having a creamy consistency which is then added to a food normally containing fat as a replacement for the fat. The calcium chloride reacts with the Slendid to form a gel and the homogenization produces the fat mimicking characteristics.

In preparing a fruit spread using the above pectin based fat mimetic, a characterizing fruit ingredient such as whole fruit, fruit puree or fruit juice in an amount from 0 to 55% is blended under low shear with a sweetener such as sugar, corn syrup, or fruit juice concentrate in an amount depending on the desired soluble solids content for the end product within the range of 20% to 70%, and with water from 0 to 80%. Slendid, in the amount of from 0.1% to 4.0% is mixed with water under high shear to provide a Slendid solution which is then added to the blend. Blending after the addition of the Slendid solution at low shear provides a homogeneous mixture of all the ingredients. The formula requires calcium ion in an amount less than 1% and this amount may be present in the fruit used for the flavoring. If it is not, the necessary amount of calcium chloride is added to the blend just before the Slendid solution. Following the addition of the Slendid solution, the mixture is de-aerated and cooked in a vacuum kettle at about 160° F. to the desired soluble solids content. After cooking, citric acid or malic acid in an amount less than 1.0% is added to adjust the pH, and the final mixture is then homogenized under high shear at about 2500 psi to microparticulate the mixture to a particle size of from about 5 to 100 microns. The particulated mixture is then hot filled into suitable containers such as jars.

In connection with attaining the fat mimetic function of the pectin based fat mimetic in the fruit spread product, it is important to homogenize the final mixture into microparticulate form prior to hot filling into the final containers. Therefore, upon the addition of the Slendid solution to the initial blend, it is necessary to have the mixture gel during the cooking process. The calcium ion is in the formulation as a gel promoter to promote this gelling and, as mentioned above, is either in the fruit or is added to the formulation. Achieving a gel during processing is contrary to the preparation of standard jellies, jams and preserves wherein it is important to delay product gelling until the latter is in its final container. Furthermore, homogenizing of the product prior to depositing the latter in its final container is also contrary to the preparation of regular jellies, jams and preserves which do not require homogenization.

Homogenization of the cooked mixture under high shear into microparticulate form in the preparation of a fruit spread using the pectin based fat mimetic is necessary in order to attain the functionality of the mimetic and thus the physical and organoleptic characteristics which provide the texture and flavor improvements according to the present invention. The microparticulate structure resulting from the homogenizing process is permanent with respect to both time and normally encountered storage and use temperatures for the product.

In this example, dairy solids from 0% to 2%, stabilizers such as pectin, carrageenan, alginate, gellan gum, or other suitable hydrocolloids from 0% to 2%, artificial flavoring from 0% to 5%, bulking agents such as cellulose, maltodextrin or polydextrose from 0% to 10%, and/or a preservative from 0% to 0.1% can be added as an optional ingredient or ingredients before or after cooking but prior to homogenizing.

An actual formula which provides the improved texture and flavor for a jelly like fruit spread, using a pectin based fat mimetic, prepared as set forth above, comprises 119 pounds of a juice concentrate, 562 pounds of sugar, 488 pounds of water, 24 pounds of Slendid and 7 pounds of citric acid. These ingredients are processed as described above to provide a soluble solids content of 55% for the finished product and a theoretical yield of 1200 pounds of product. This formula presumes that the necessary calcium ions are in the juice concentrate. If they are not, up to 2 pounds of calcium chloride would be added where indicated in the process described above.

The final product produced in accordance with the foregoing example is a fruit spread having a creamy texture which facilitates the spreading thereof and which provides a good mouthfeel and a decreased dissipation rate in the mouth during consumption and thus an enhanced flavor relative to traditional fruit spread products.

A bakery filling or jelly having high bake stability and water retention with minimum weeping is produced by cooking the ingredients in the foregoing example to a soluble solids content of from 60% to 80%. The high solids content reduces the water available for transmission to the dough of a bakery product during baking thereof, and the microparticulate structure resulting from homogenizing the cooked mixture under high shear captures water and moisture in the particle cells, thus to minimize weeping when the bakery filling is cut and applied to the bakery dough. The fat mimetic provides the texture and stability which enhances resistance of the bakery filling or jelly against spreading when subjected to baking temperatures.

EXAMPLE II

A fruit spread having improved texture and flavor characteristics is prepared using a starch based fat mimetic and in particular a product marketed by Staley Manufacturing Company under the trade name Stellar which is a modified corn starch fat mimetic. In making a fruit spread using this starch based fat mimetic, 0% to 55% of a whole fruit, fruit puree, or fruit juice is blended with 10% to 75% of a sweetener, such as sugar, corn syrup, or fruit juice concentrate, 0% to 80% of water, and 5% to 20% of Stellar at a low shear. The blend is heated to about 160° F., and 0% to 2% of a stabilizer such as pectin, carrageenan, alginate, gellan gum or other suitable hydrocolloid is mixed with water to provide a solution which is then added to the blend. This mixture is then cooked in a vacuum kettle at a temperature of about 160° F. to a desired soluble solid content between about 20% to 70%. Upon reaching the desired soluble solids content, the mixture is homogenized under a high shear at about 8000 psi to produce a particle gel with a particle aggregate size of from about 2 to 15 microns following which the product is hot filled into its final containers. If desired, 0.1% by weight of potassium sorbate can be added as a preservative after cooking, and 0% to 10% of a bulking agent such as cellulose, maltrodextrin or polydextrose, and 0% to 2% dairy solids can be added to the blend prior to the initial heating.

A preferred formula which provides the improved texture and flavor for a fruit spread, using a starch based fat mimetic, prepared as set forth above, comprises 35% fruit, fruit puree or fruit juice, 48% of a sweetener, 6.5% water, 0.5% pectin and 10% Stellar.

The product produced in accordance with the foregoing example is a fruit spread having a creamy texture which facilitates the spreading thereof and which provides a good mouthfeel and a decreased dissipation rate in the mouth during consumption and thus an enhanced flavor relative to standard fruit spread products.

A bakery filling or jelly having high bake stability and water retention with minimum weeping is produced by cooking the ingredients in the foregoing example to a soluble solids content of from 60% to 80%. The high solids content reduces the water available for transmission to the dough of a bakery product during baking thereof, and the microparticulate structure resulting from homogenizing the cooked mixture under high shear captures water and moisture in the particle cells, thus to minimize weeping when the bakery filling is cut and applied to the bakery dough. The fat mimetic provides the texture and stability which enhances resistance of the bakery filling or jelly against spreading when subjected to baking temperatures.

EXAMPLE III

A fruit spread having improved texture and flavor in accordance with the invention is prepared using a cellulose based fat mimetic and in particular a microcrystalline cellulose fat mimetic product marketed by FMC Corporation under the trademark Avicel. A fruit spread using this fat mimetic is prepared by blending, at low shear, 0% to 55% of a characterizing fruit ingredient of whole fruit, fruit puree or fruit juice with 10% to 75% of a sweetener, such as sugar, corn syrup, or fruit juice concentrate, and 0% to 80% of water. 0.05% to 0.5% of microcrystalline cellulose is prepared in a water solution with 0.1% to 1.0% of a stabilizer which is either pectin, or locust bean gum or xanthan gum, and this solution is added to the flavor and sweetener blend. The mixture is then cooked in a vacuum kettle at a temperature of about 160° F. to a desired soluble solids content between about 20% to 70%. After cooking, 0% to 1.0% citric acid or malic acid is added to adjust the pH, and the mixture is hot filled in its final containers wherein it gels. Unlike Examples I and II, homogenizing is not necessary to attain the fat mimicking characteristics when the fat mimetic is cellulose based. If desired, 0.1% potassium sorbate can be added as a preservative after cooking, and 0% to 10% of a bulking agent such as cellulose, maltodextrin or polydextrose, and 0% to 2% dairy solids can be added prior to adding the microcrystalline cellulose solution.

A preferred formula which provides the improved texture and flavor for a fruit spread using a cellulose based fat mimetic, prepared as set forth above, comprising 35% fruit, fruit puree or fruit juice, 55% of a sweetener, 9.5% water, 0.2% of a stabilizer, 0.2% citric acid and 0.1% microcrystalline cellulose.

The product produced in accordance with the foregoing example is a fruit spread having a creamy texture which facilitates the spreading thereof and which provides a good mouthfeel and a decreased dissipation rate in the mouth during consumption and thus an enhanced flavor relative to standard fruit spread products.

A bakery filling or jelly having high bake stability is produced by cooking the ingredients in the foregoing example to a soluble solids content of from 60% to 80%. While the cooked ingredients are not homogenized and microparticulated as in Examples I and 2, water activity is reduced by the high solids content, and the fat mimetic provides the texture and stability which enhances resistance of the bakery filling or jelly against spreading when subjected to baking temperatures.

EXAMPLE IV

A fruit spread having improved texture and flavor characteristics is prepared using carrageenan as a fat mimetic. A fruit spread using this fat mimetic is prepared by blending 0% to 55% of a whole fruit, fruit puree or fruit juice flavoring with 10% to 75% of a sweetener such as sugar, corn syrup, or fruit juice concentrate and 0% to 80% of water at a low shear. The blend is then heated to between about 150° F. and 160° F. 1.0% to 3.0% of carrageenan is mixed with water to make a carrageenan solution which is then added to the heated blend. 0% to 10.0% by weight of cellulose powder, maltodextrin, or polydextrose is then added to the mixture as a bulking agent, and the final mixture is cooked in a vacuum kettle at about 160° F. to a desired soluble solids content between about 20% to 70%. The cooked mixture is hot filled into its final containers wherein it gels. If desired, 0.1% potassium sorbate can be added as a preservative after cooking. Optional ingredients for this fruit spread include 0% to 2% dairy solids and 0% to 5% added flavors which are added after cooking. As in Example III, homogenizing is not necessary to attain the fat mimicking characteristics when the fat mimetic is carrageenan.

A preferred formula which produces the improved texture and flavor for a fruit spread using carrageenan as a fat mimetic, prepared as set forth above, comprises 35% fruit, fruit puree or fruit juice, 50% sugar, 11.5% water, 2% cellulose powder and 1.5% carrageenan.

The product produced in accordance with the foregoing example is a fruit spread having a creamy texture which facilitates the spreading thereof and which provides a good mouthfeel and a decreased dissipation rate in the mouth during consumption and thus an enhanced flavor relative to standard fruit spread products.

EXAMPLE V

A fruit spread having improved texture and flavor characteristics prepared using a protein based fat mimetic and in particular a protein based fat mimetic product marketed by NutraSweet Company under the trademark Simplesse. A fruit spread using this protein based fat mimetic is prepared by blending, at a low shear, 0% to 55% of a whole fruit, fruit puree or fruit juice with 10% to 75% of a sweetener such as sugar, corn syrup or fruit juice concentrate and 0% to 80% of water, and heating the blend to a temperature between about 150° F. to 160° F. 0.1% to 2.0% of a stabilizer such as pectin, carrageenan, alginate, gellan gum, or other suitable hydrocolloid, is prepared with water to provide a pectin solution, and the latter and 2% to 20% of Simplesse are added to the heated blend. This mixture is then cooked in a vacuum kettle at a temperature of about 160° F. to a desired soluble solids content between about 20% to 70%. Following cooking, the mixture is cooled to about 130° F. to 140° F. and then filled into its final containers in which it gels. If desired, 0.1% by weight of potassium sorbate can be added as a preservative after cooking and before cooling of the mixture and 0% to 10% of a bulking agent such as cellulose, maltodextrin, or polydextrose, and 0% to 2% dairy solids can be added prior to the initial heating. It will be noted too, that homogenizing is not necessary to attain the fat mimicking characteristics when the fat mimetic is protein based.

A preferred formula which provides the improved texture and flavor for a fruit spread using a protein based fat mimetic, prepared as set forth above, comprises 35% fruit, fruit puree or fruit juice, 50% sugar, 9.4% water, 0.5% pectin and 5.0% Simplesse.

The product produced in accordance with the foregoing example is a fruit spread having a creamy texture which facilitates the spreading thereof and which provides a good mouthfeel and a decreased dissipation rate in the mouth during consumption and thus an enhanced flavor relative to standard fruit spread products.

EXAMPLE VI

A fruit syrup is prepared using the pectin based fat mimetic Slendid as in Example I and in the amount of from 0.1% to 4.0%. Other ingredients include a characterizing fruit ingredient such as fruit puree or fruit juice in an amount from 0% to 55%, a sweetener in the amount of from 10% to 75%, calcium chloride as a gel promoting agent for the Slendid in the amount of from 0% to 1.0%, and water in the amount from 0% to 80%. In preparing the fruit syrup, a first portion of the sweetener, amounting to less than 25% of the total amount of the sweetener is metered into a mixer. The water, less that needed for the Slendid solution, at a temperature of about 180° F. is added to the mixer, and these ingredients are mixed for about five minutes. If desired a stabilizer such as xanthan gum, pectin, carrageenan, alginate or other suitable hydrocolloid in an amount from 0% to 2.0% can be added to the mixer with the water. The remaining amount of the sweetener is then metered into a mixing kettle, the fruit and calcium chloride are added thereto, and these ingredients are mixed in the kettle and heated to a temperature of about 190° F. The Slendid, mixed with water under high shear to provide a Slendid solution, is then added to the mixing kettle and mixed thoroughly with the other ingredients therein. The sweetener and water mixture is then added to the mixing kettle, and the mixture is vacuum cooked therein at about 160° F. to a soluble solids content of from 20% to 80%. After cooking, if necessary, a food acid in the amount from 0% to 4% can be added to adjust the pH to between about 2.9 to 4.0, and the final mixture is then homogenized under high shear at about 2500 psi to microparticulate the mixture to a particle size of from about 5 to 100 microns. The particulated mixture is then hot filled into suitable containers.

If desired, flavoring agents in an amount up to 2% and coloring in an amount up to 2% can be added as optional ingredients prior to cooking. Other optional ingredients include bulking agents such as polydextrose, maltodextrin or cellulose, high intensity sweeteners such as aspartame, sucralose, saccharin and the like, and a preservative such as potassium sorbate.

An actual formula which provides the improved texture for a fruit syrup, prepared as set forth above, comprises 850 pounds of fruit puree or fruit juice, a total amount of 2155 pounds of corn syrup on a dry basis, 15.5 pounds of Slendid, 3.2 pounds of a flavoring, 2.3 pounds of Xanthan gum, 2.0 pounds of citric acid, 1.0 pound of a coloring agent, 0.3 pound of calcium chloride, and 427.7 pounds of water. The first portion of the sweetener is 400 pounds of the corn syrup, and the ingredients are processed as described above to provide a soluble solids content of 65% and a pH of 3.15.

EXAMPLE VII

Chocolate syrup having improved texture is prepared using a mixture of a starch based fat mimetic, and in particular a product marketed by National Starch Company under the trade name N-Lite-L, and the protein based fat mimetic Simplesse used in Example V. A syrup including this fat mimetic mixture is prepared by placing from 20% to 75% of a dry sweetener in a mixing kettle. In a high shear mixer, 0.5% to 5% of the fat mimetic N-Lite-L is mixed with 0% to 4.0% of starch and enough water to make a 25% solution to which is then added 0.5% to 5.0% Simplesse and from 2% to 15% cocoa, all of which ingredients are then mixed well. The latter mix is then added to the mixing kettle together with the remaining water which, in total, is in the amount from about 25% to 80%, and the mixture in the kettle is then heated to a temperature of about 210° F. for fifteen minutes. This mixture is then vacuum cooked at a temperature of about 160° F. to a soluble solids content of from 20% to 80% and hot filled into suitable containers. If desired, up to 2% of salt, up to 2% of an emulsifier and up to 4% of a flavoring can initially be added to the mixing kettle with the sweetener. Following cooking, as a further option, a preservative in the amount from 0% to 0.1% can be added and mixed with the cooked solution.

In this example, stabilizers such as pectin, alginate, carrageenan or other suitable hydrocolloids, bulking agents such as polydextrose, maltodextrin or cellulose, high intensity sweeteners such as aspartame or sucralose, and buffering agents such as disodium phosphate can be added as an optional ingredient or ingredients.

An actual formula which provides a chocolate syrup having improved texture using a mixture of protein based and starch based fat mimetics, prepared as set forth above, comprises 100 pounds of cocoa, 650 pounds of sugar, 30 pounds of Simplesse, 12 pounds of N-Lite-L, 12 pounds of starch, 0.8 pound salt, 1.2 pounds of flavoring, 0.8 pound of polysorbate 60 as the emulsifier, 1.2 pounds potassium sorbate as a preservative, and 416.2 pounds of water. These ingredients are processed as described above to provide a soluble solids content of 66% for the finished product.

EXAMPLE VIII

A breakfast bar filling or bakery filling having improved texture and flavor characteristics is prepared using Slendid as the fat mimetic. The breakfast bar or bakery filling is prepared by mixing, in a mixing kettle, 0% to 55% of a fruit puree or fruit juice, 20% to 75% of a sweetener, 0% to 1.0% calcium chloride, and with water which, including an amount to make the Slendid solution, totals up to 40%. The mixture is then heated in the kettle to a temperature of about 160° F. Slendid in an amount from 0.1% to 4.0% is mixed with water to provide a 4% solution which is then added to the mixing kettle and mixed thoroughly with the ingredients therein. The mixture is vacuum cooked at a temperature of about 160° F. to a soluble solids content of from 60% to 80%. Following cooking, 0% to 4% pectin is combined in a high shear mixer with water to provide a 4% pectin solution which is added to the cooked mixture. Thereafter, the total mixture is homogenized under high shear at about 2500 psi to micropaticulate the mixture to a particle size of from 5 to 100 microns. The particulated mixture is then hot filled into suitable containers. If desired, a coloring up to 1%, a humectant in an amount from 0% to 20% and a bulking agent in an amount from 0% to 25% can be added as initial ingredients mixed in the mixing kettle, and from 0% to 1.5% of a second stabilizer such as xanthan gum can be mixed with the Slendid solution during preparation thereof. Other optional ingredients include up to 5% of a flavoring mixed with the pectin solution, and up to 2% of a food acid added after cooking to adjust the pH of the filling to between 3.0 and 4.0.

An actual formula which provides the improved texture and flavor for a breakfast bar or bakery filling, prepared as set forth above, comprises 386 pounds of a fruit puree or juice, 650 pounds of corn syrup solids, 277 pounds of maltodextrin as the bulking agent, 255 pounds of glycerin as the humectant, 20.4 pounds of Slendid, 12.75 pounds of pectin, 10.20 pounds flavoring 6.0 pounds of citric acid, 1.3 pounds of Xanthan gum as a stabilizer, 0.72 pound of calcium chloride, 0.26 pound coloring, and 112.6 pounds of water. These ingredients are processed as described above to provide a soluble solids content of 73% and a pH of 3.4 for the finished product.

In this example, other stabilizers such as starch, alginate, carrageenan or any other suitable hydrocolloid, and other bulking agents such as polydextrose or cellulose can be used. Other optional ingredients include high intensity sweeteners such as sucralose, and preservatives such as potassium sorbate.

The final product produced in accordance with the foregoing example is a breakfast bar or bakery filling having high bake stability and water retention with minimal weeping of water therefrom into a bakery dough when exposed to baking temperatures.

EXAMPLE IX

A yogurt filling having improved texture and flavor is prepared using Slendid as the fat mimetic. The yogurt filling is prepared by combining 20% to 65% of a fruit puree or fruit juice, a sweetener in the amount of 0% to 75%, and calcium chloride in the amount of 0% to 2% in a mixing kettle and heating the mixture to 160° F. Slendid in the amount of from 0.1% to 4.0% is combined in a high shear mixer with enough water to make a 6% Slendid solution which is then added to the mixing kettle. Pectin in the amount of from 0.5% to 3.0% is combined in a high shear mixer with enough water to make a 4% solution which is then added to the mixing kettle. The mixture is then vacuum cooked at a temperature of about 160° F. to a soluble solids content of from 20% to 75%. The cooked mixture is then homogenized under high shear at about 2500 psi to microparticulate the mixture to a particle size of from about 5 to 100 microns. The particulated mixture is then hot filled into suitable containers. After cooking, if desired, an acidulant in an amount from 0% to 2.0% can be added to adjust the pH to from about 3.0 to 4.0. A flavoring in the amount of from 0% to 3.0% can also be added, as an option, following cooking and prior to homogenization.

Other optional ingredients on the foregoing example include water, other stabilizers such as Xanthan gum, alginate, locust bean gum, starch or other suitable hydrocolloids, bulking agents such as polydextrose, maltodextrin or cellulose, high intensity sweeteners such as aspartame, sucralose and the like, buffering agents such as sodium citrate, and preservatives such as potassium sorbate.

An actual formula which provides the improved texture and flavor for a yogurt filling using a pectin based fat mimetic, prepared as set forth above, comprises 1290 pounds of fruit puree or fruit juice, a total sweetener weight of 1599 pounds of which about 60% is corn syrup solids and about 40% is sucrose, 23 pounds of pectin, 43 pounds of Slendid, 8.6 pounds of flavoring, 9.8 pounds of lemon juice as the acidulant and 1.0 pound of calcium chloride. These ingredients are processed as described above to provide a soluble solids content of 62% and a pH of 3.6 for the finished product.

EXAMPLE X

A cookie filling is prepared using Slendid as the fat mimetic. The cookie filling is prepared by combining, in a mixing kettle, from 0% to 75% of a fruit puree or fruit juice, from 0% to 80% of a sweetener, from 10% to 80% water, and calcium chloride in an amount from 0% to 2%, and heating the mix to a temperature of about 160° F. Slendid in an amount from about 0.1% to 4.0% is combined in a high shear mixer with enough water to make a 6% solution which is then added to the mixing kettle. Pectin in an amount of from 0.5% to 3.0% is combined in a high shear mixer with enough water to make a 4% solution which is then added to the mixing kettle. The mixture in the mixing kettle is then vacuum cooked at a temperature of about 160° F. to a soluble solids content between 20% and 75%. The cooked mixture is then homogenized under high shear at about 2500 psi to microparticulate the mixture to a particle size of from about 5 to 100 microns. The particulated mixture is then hot filled into suitable containers. After cooking, a food acid in the amount of 0% to 2.0% can be added to adjust the pH to between 3.0 and 7.0.

In this example, additional possible ingredients include stabilizers such as alginate, carrageenan, starch or other suitable hydrocolloids, bulking agents such as maltodextrin, polydextrose or cellulose, flavoring ingredients such as cocoa, natural and/or artificial flavors, high intensity sweeteners such as aspartame or sucralose, buffering agents such as sodium citrate, and preservatives such as potassium sorbate.

A preferred formula which provides improved texture and flavor for a cookie filling using a pectin based fat mimetic, prepared as set forth above, comprises 225 pounds of fruit juice or fruit puree, a total of 1961 pounds of sweetener of which about 60% is corn syrup solids and about 40% is sucrose, 29 pounds of pectin, 42 pounds of Slendid, 2 pounds of calcium chloride, 4 pounds of citric acid and 577 pounds of water. These ingredients are processed as described above to provide a soluble solids content of 62% and a pH of 3.6.

The product produced in accordance with the foregoing example is a cookie filling having a creamy texture and which provides good mouth feel and a decreased dissipation rate in the mouth during consumption and thus an enhanced flavor relative to traditional cookie fillings.

EXAMPLE XI

A fruit juice or fruit juice beverage is prepared using Slendid as the fat mimetic. The fruit juice or beverage is prepared by filling a mixing tank with water in an amount from 10% to 95% and adding first and second fruit juice concentrates to the tank in the amounts from 0% to 90% and 0% to 80%, respectively, together with calcium chloride in an amount from 0% to 1.0%. 0.25% to 5.0% Slendid is combined in a high shear mixer with enough water to make a 4% solution which is then added to the mixing tank, wherein the ingredients are thoroughly mixed and heated to a temperature of about 170° F. for a period of time to provide a soluble solids content of from 5% to 30%. The mixture is then homogenized under high shear at about 2500 psi to microparticulate the mixture to particle size of from about 5 to 100 microns, after which the mixture, at a temperature of about 165° F., is hot filled into suitable containers. If desired, flavoring in an amount up to 10% can be added to the mixing tank as an initial ingredient.

Additional ingredients which can be used in the foregoing example include hydrocolloids such as pectin, alignate or carrageenan, bulking agents such as polydextrose, maltrodextrin or cellulose, flavoring agents such as dairy solids, acids, spices and the like, high intensity sweeteners such as aspartame and sucralose, buffering agents such as disodium phosphate and sodium citrate, and preservatives such as potassium sorbate.

A preferred formula for preparing a fruit juice or fruit juice beverage having improved texture and taste, prepared as set forth above, comprises 1744.1 pounds of the first fruit juice concentrate, 532 pounds of white grape juice concentrate as the second fruit juice concentrate, 121.75 pounds of flavoring, 125 pounds of Slendid, 4.5 pounds of calcium chloride and 10,058 pounds of water. These ingredients are processed as described above to provide a soluble solids content of 13.3% and a pH of 3.7.

EXAMPLE XII

A vegetable juice having improved texture is prepared using Slendid as the fat mimetic. The ingredients for the vegetable juice include tomato paste concentrate in an amount from 5% to 30%, tomato juice blend in an amount from 0% to 30%, Slendid in an amount from 0.25% to 5.0%, calcium chloride in an amount from 0% to 1.0%, and water in an amount from 50% to 90%. The vegetable juice is prepared by combining, in a mixing tank, water, tomato paste concentrate, tomato juice and calcium chloride, and mixing these ingredients well. Slendid is combined in a high shear mixer with sufficient water to make a 4% solution which is mixed thoroughly and then added to the mixing tank. The total mixture is then homogenized under high shear at about 2500 psi to microparticulate the mixture to a particle size of from 5 to 100 microns. Thereafter, the homogenized mixture is heated to a temperature of about 170° F. for a period sufficient to provide a soluble solids content of from 5% to 30%, whereupon the mixture is hot filled into suitable containers. If desired, for enhanced flavor and texture, bell peppers in an amount up to 1% can initially be mixed with a portion of the total amount of water for at least fifteen minutes after which salt in an amount up to 1% and the tomato paste are added to the water and bell peppers. This mix is then pumped into a mixing tank together with the remaining water. The tomato juice blend, lemon juice concentrate in an amount up to 3% and the calcium chloride are then added to the mixing tank prior to the preparation and addition of the Slendid solution thereto.

Additional ingredients in this example may include stabilizers such as pectin, alginate, carrageenan or other suitable hydrocolloids, bulking agents such as polydextrose, maltodextrin or cellulose, flavoring agents such as spices and acids, buffering agents such as disodium phosphate or sodium citrate, and preservatives such as potassium sorbate.

A preferred formula which provides a vegetable juice having improved texture and flavor, using a pectin based fat mimetic, prepared as set forth above, comprises 540 pounds of tomato paste concentrate, 326 pounds of tomato juice blend, 24 pounds of lemon juice concentrate, 28 pounds of Slendid, 5 pounds of bell peppers, 7 pounds of salt, 1 pound of calcium chloride and a total of 1885 pounds of water. The first portion of water mixed with the bell peppers is 800 pounds. These ingredients are processed as described above to provide a soluble solids content of 6.9% for the finished product.

EXAMPLE XIII

A pie glaze or filling having improved texture and flavor characteristics is prepared using a mixture of the starch based fat mimetic N-Lite-L and the protein based fat mimetic Simplesse. The ingredients for the glaze or filling include a characterizing fruit ingredient in an amount from 0% to 60%, a sweetener in the amount from 10% to 60%, a stabilizer in the amount from 0% to 5%, N-Lite-L in an amount from 0.5% to 3.0%, Simplesse in an amount from 0.5% to 5.0%, and water in an amount from 40% to 80%. The glaze or filling is prepared by mixing more than half of the total quantity of water, cold, with the stabilizer, N-Lite-L and Simplesse. The fruit ingredient, sweetener and the remaining quantity of water are mixed in a mixing kettle, and heating of the ingredients in the kettle is begun. The stabilizer-fat mimetic solution is then metered into the kettle and the mixing kettle is then heated to a temperature of about 200° F. and held at the latter temperature for a period sufficient to cook the ingredients to a soluble solids content of from 10% to 70%. After cooking, the product is deaerated and hot filled into suitable containers at a temperature of about 175° F. Optionally, a coloring agent in an amount up to 0.5% and a preservative in an amount up to 0.1% can be added to the mixing kettle prior to metering the fat mimetic solution thereinto, and a food acid can be added after cooking to adjust the pH of the glaze to from 2.8 to 4.0.

A preferred formula which provides the improved texture and flavor for a pie glaze or filling, prepared as set forth above, comprises 400 pounds of whole fruit, fruit puree or fruit juice, 555.8 pounds of sucrose, 90 pounds of starch as the stabilizer, 28 pounds of N-Lite-L, 60 pounds of Simplesse, 2 pounds of citric acid as the food acid, 1.75 pounds of potassium sorbate as the preservative, 0.15 pounds of a coloring agent and 1779.5 pounds of water. These ingredients are processed as described above, using 1250 pounds of the water to provide the stabilizer-fat mimetic solution, and the ingredients are cooked in the mixing kettle at 200° F. for 2 minutes to provide a soluble solids content of 39% for the finished product which has a pH of 3.4.

In the foregoing example, the stabilizer may be pectin, alginate, carrageenan or other suitable hydrocolloid, and other possible ingredients include bulking agents such as polydextrose, maltodextrin and cellulose, flavoring agents such as dairy solids, chocolate, cocoa and spices, high intensity sweeteners such as aspartame and sucralose, and buffering agents such as disodium phosphate and sodium citrate.

EXAMPLE XIV

A maple flavored syrup having improved texture is prepared using a mixture of the starch based fat mimetic N-Lite-L and the protein based fat mimetic Simplesse. The ingredients for the syrup include a sweetener in an amount from 10% to 80%, N-Lite-L in an amount from 0.25% to 4%, Simplesse in an amount from 0.25% to 5%, flavoring in an amount from 0.1% to 10%, coloring in an amount from 0.01% to 1%, a stabilizer in the amount from 0% to 0.5%, and water in an amount from 20% to 85%. The syrup is prepared by thoroughly mixing a small portion of the sweetener with the N-Lite-L, Simplesse and stabilizer in a mixer. The remainder of the sweetener, the coloring agent and water are combined in a mixing kettle and heated therein to a temperature of about 160° F. The sweetener-fat mimetic-stabilizer solution is then metered into the mixing kettle and mixed thoroughly with the heated ingredients therein, after which the ingredients in the mixing kettle are vacuum cooked at a temperature of about 160° F. to provide a soluble solids content in the final product of from 10% to 80%. After cooking, the flavoring is added and the product is heated to a temperature of about 170° F. and hot filled into suitable containers.

A preferred formula for the syrup includes 1575 pounds of corn syrup solids, 25 pounds of N-Lite-L, 55 pounds of Simplesse, 10 pounds of flavoring, 2 pounds of a coloring agent, 2 pounds of xanthan gum as the stabilizer and 648 pounds of water. These ingredients are processed as described above, using 100 pounds of the corn syrup solids in the sweetener-fat mimetic-stabilizer solution, and are vacuum cooked to provide a soluble solids content of 72% for the finished product.

In the foregoing example, the stabilizer can be pectin, alginate, carrageenan or other suitable hydrocolloid, and additional possible ingredients include bulking agents such as polydextrose, maltodextrin and cellulose, flavoring agents such as dairy solids, butter, salt and spices, high intensity sweeteners such as sucralose, aspartame and saccharin, buffering agents such as disodium phosphate and sodium citrate, and preservatives such as potassium sorbate.

EXAMPLE XV

A creamy salsa having improved texture is prepared using a mixture of the starch based fat mimetic N-Lite-L and the protein based fat mimetic Simplesse. The ingredients for the salsa include diced tomatoes and tomato paste in an amount from 0% to 40%, tomato sauce in an amount from 0% to 30%, a stabilizer in the amount from 0% to 5%, N-Lite-L in an amount from 0.25% to 4%, Simplesse in an amount from 0.25% to 6%, sugar in an amount from 0% to 5%, and water in an amount from 20% to 80%. The salsa is prepared by combining the water, sugar, Simplesse, N-Lite-L, and stabilizer in a mixing kettle and mixing the ingredients thoroughly therein. The diced tomatoes, tomato paste and tomato sauce are then added to and mixed with the ingredients in the mixing kettle. The total mixture is heated to a temperature of about 200° F. and cooked for a period of time to provide a soluble solids content of from 5% to 50% following which the product is hot filled into suitable containers. If desired, for enhanced flavor and texture salt in an amount from 0% to chili powder in an amount from 0% to 4% and vinegar in an amount from 0% to 2% can be included as initial ingredients in the mixing kettle, and diced Jalapeno peppers in an amount from 0% to 20% and chopped onions in an amount from 0% to 15% can be added to the mixing kettle with the tomatoes, tomato paste and tomato sauce.

A preferred formula for the salsa includes 610 pounds of diced tomatoes and tomato paste, 395 pounds of tomato sauce, 140 pounds of diced peppers, 36 pounds of chopped onions, 20 pounds of starch as the stabilizer, 22 pounds N-Lite-L, 55 pounds of Simplesse, 10 pounds of sugar, 10 pounds of salt, 10 pounds of chili powder, 4.2 pounds of vinegar, and 865 pounds of water. These ingredients are processed as described above and cooked for five minutes to provide a soluble solids content of 11% for the final product which has a pH of 4.0. Optionally, garlic in an amount to suit taste can be added at the point in the process when the peppers and onions are added to the mixing kettle.

The stabilizer in the foregoing example can be pectin, alginate, carrageenan or other suitable hydrocolloid, and other additional ingredients can include a bulking agent such as polydextrose, maltodextrin or cellulose, flavoring agents such as spices, buffering agents such as disodium phosphate, and a preservative such as potassium sorbate.

Although the present invention has been described with respect to various specific embodiments, various modifications will be apparent from the present disclosure and are intended to be within the scope of the following claims.

Having thus described the invention it is claimed:

1. In a non-fat food product comprising a mixture of a non-fat food ingredient, selected from the group consisting of whole fruit, fruit puree, fruit juice, fruit juice concentrate, cocoa, tomatoes, tomato juice, tomato paste, tomato paste concentrate, tomato sauce and mixtures thereof, at least one of water and a sweetener, and at least one of a stabilizer and a gel promoting agent, the improvement comprising: a fat mimetic as an additional ingredient for providing said food product with the physical and organoleptic characteristics of fat, said fat mimetic being selected from the group consisting of pectin based, starch based, and protein based fat mimetics and mixtures thereof.

2. The improved food product according to claim 1, wherein said fat mimetic is a starch based fat mimetic constituting about 5% to 20% by weight of said mixture.

3. The improved food product according to claim 2, wherein said mixture is particulated and has a particulate aggregate size of from about to 2 to 15 microns.

4. The improved food product according to claim 3, wherein said product has a soluble solids content of between 20% to 70%.

5. The improved food product according to claim 4, wherein said product has a soluble solids content of between 60% and 80%.

6. The improved food product according to claim 1, wherein said fat mimetic is a protein based fat mimetic constituting about 2.0% to 20% by weight of said mixture.

7. The improved food product according to claim 6, wherein said product has a soluble solids content of between 20% to 70%.

8. The improved food product according to claim 6, wherein said product has a soluble solids content of between 60% and 80%.

9. The improved product according to claim 1, wherein said fat mimetic consists of a protein based fat mimetic constituting about 0.25% to 6.0% by weight of said mixture and a starch based fat mimetic constituting from about 0.25% to 5.0% by weight of said mixture, said non-fat food ingredient is selected from the group consisting of cocoa, whole fruit, fruit puree, fruit juice, tomatoes, tomato paste, tomato sauce and mixtures thereof, and said products-has a soluble solids content between 5% and 80%.

10. The improved food product according to claim 1, comprising up to about 55% by weight of a characterizing fruit ingredient selected from the group consisting of whole fruit, fruit puree and fruit juice, about 10% to 75% by weight of a sweetener, up to about 80% by weight of water, a stabilizer, and about 5% to 20% by weight of a starch based fat mimetic, said food product having a soluble solids content of from about 60% to 80% by weight and being particulated and having a particle aggregate size of between about 2 and 15 microns.

11. The improved food product according to claim 1, comprising up to about 55% by weight of a characterizing fruit ingredient selected from the group consisting of fruit puree and fruit juice, about 10% to 75% by weight of a sweetener, up to about 80% by weight of water, a food acid, a gel promoting agent, a stabilizer, and a pectin based fat mimetic in an amount between about 0.1% and 4.0% by weight, said food product having a soluble solids content of between about 20% and 80% by weight and being particulated and having particles of between about 5 and 100 microns.

12. The improved food product according to claim 1, comprising about 2% to 15% by weight of cocoa, about 20% to 75% by weight of a sweetener, about 25% to 80% by weight of water, a stabilizer, an emulsifier and about 0.5% to 5.0% by weight of each of a starch based fat mimetic and a protein based fat mimetic, said food product having a soluble solids content between about 20% and 0% by weight.

13. The improved food product according to claim 1, comprising up to about 55% by weight of a characterizing fruit ingredient selected from the group consisting of whole fruit, fruit puree and fruit juice, from about 20% to 75% of a sweetener, up to 40% by weight of water, a humectant, a bulking agent, a stabilizer, a food acid, a gel promoting agent, and a pectin based fat mimetic in an amount between about 0.1% and 4% by weight, said food product having a soluble solids content of between about 60% to 80% by weight and being particulated and having particles between about 5 and 100 microns.

14. The improved food product according to claim 1, comprising about 20% to 65% by weight of a characterizing fruit ingredient selected from the group consisting of fruit puree and fruit juice, up to about 75% by weight of a sweetener, a stabilizer, a gel promoting agent and about 0.1% to 4.0% by weight of a pectin based fat mimetic, said food product being particulated and having particles of between about 5 and 100 microns and having a soluble solids content of from about 20% to 75% by weight.

15. The improved food product according to claim 1, comprising up to about 75% by weight of a characterizing fruit ingredient selected from the group consisting of fruit puree and fruit juice, up to about 80% by weight of a sweetener, from about 10% to 80% by weight of water, a stabilizer, a food acid, a gel promoting agent, and a pectin based fat mimetic in an amount between about 0.1% and 4.0% by weight, said food product having a soluble solids content of from about 20% to 75% by weight and being particulated and having particles of between about 5 and 100 microns.

16. The improved food product according to claim 1, comprising up to about 90% by weight of a fruit juice concentrate, up to about 80% by weight of white grape juice concentrate, from about 10% to 95% by weight of water, a gel promoting agent, and a pectin based fat mimetic in an amount between about 0.25% and 5% by weight, said food product having a soluble solids content of from 5% to 30% by weight and being particulated and having particles of between about 5 and 100 microns.

17. The improved food product according to claim 1, comprising from about 5% to 30% by weight of a tomato paste concentrate, up to about 30% by weight of tomato juice, from about 50% to 90% by weight of water, a gel promoting agent, and a pectin based fat mimetic in an amount between about 0.25% and 5% by weight, said food product having a soluble solids content of from 5% to 30% and being particulated and having particles of between about 5 and 100 microns.

18. The improved food product according to claim 17, and further including lemon juice concentrate in an amount up to about 3% by weight, bell peppers in an amount up to about 1.0% by weight, and salt in an amount up to about 1.0% by weight.

19. The improved food product according to claim 1, comprising up to about 60% by weight of a fruit ingredient selected from the group consisting of whole fruit, fruit puree and fruit juice, from about 10% to 60% by weight of a sweetener, from about 40% to 80% by weight of water, a stabilizer, a food acid, about 0.5% to 3.0% by weight of a starch based fat mimetic, and about 0.5% to 5.0% by weight of a protein based fat mimetic, said food product having a soluble solids content of from about 10% to 70% by weight.

20. The improved food product according to claim 1, comprising about 10% to 80% by weight of a sweetener, about 20% to 85% by weight of water, a stabilizer, flavoring in an amount from about 0.4% to 10% by weight, about 0.25% to 4% by weight of a starch based fat mimetic, and about 0.25% to 5.0% of a protein based fat mimetic, said food product having a soluble solids content of from about 10% to 80% by weight.

21. The improved food product according to claim 1, comprising up to about 40% by weight of whole tomato pieces and tomato paste, up to about 30% by weight of tomato sauce, up to about to 20% by weight of jalapeno pepper pieces, up to about 15% onion pieces, about 20% to 80% by weight of water, a stabilizer, about 0.25% to 4.0% by weight of a starch based fat mimetic, and about 0.25% to 6% by weight of a protein based fat mimetic, said food product having a soluble solids content of from about 5% to 50%.

22. The improved food product according to claim 21, and further including sugar in an amount up to about 5% by weight, salt in an amount up to about 2% by weight, chili powder in an amount up to 2% by weight, and vinegar in an amount up to about 2% by weight.

23. In a method of preparing a non-fat food product comprising mixing a non-fat food ingredient selected from the group consisting of whole fruit, fruit puree, fruit juice, fruit juice concentrate, cocoa, tomatoes, tomato juice, tomato paste, tomato paste concentrate, tomato sauce and mixtures thereof, at least one of water and a sweetener, and at least one of a stabilizer and a gel promoting agent, and cooking the mixture to a desired soluble solids content, the improvement comprising: selecting a fat mimetic from the group consisting of pectin based, starch based, and protein based fat mimetics and mixtures thereof, and adding said selected fat mimetic to said mixture before said cooking thereof.

24. The improved method according to claim 23, wherein said fat mimetic is a starch based fat mimetic constituting from about 5% to 20% by weight of said mixture, and homogenizing said cooked mixture to produce a particle gel having a particle aggregate size of about 2 to 15 microns.

25. The improved method according to claim 23, wherein said fat mimetic is a protein based fat mimetic constituting about 2% to 20% by weight of said mixture.

26. The improved method according to claim 23, wherein said fat mimetic includes from about 0.25% to 5.0% by weight of a starch based fat mimetic and from about 0.25% to 6.0% by weight of a protein based fat mimetic.

27. The improved method according to claim 23, comprising, mixing up to 55% by weight of a characterizing fruit ingredient selected from the group consisting of whole fruit, fruit puree and fruit juice, with 10% to 75% by weight of a sweetener selected from the group consisting of sugar, corn syrup and fruit juice concentrate, up to 80% by weight of water and 5% to 20% by weight of a starch based fat mimetic, heating said mixture, adding a stabilizer to said heated mixture, cooking said mixture to a soluble solids content of from about 60% to 80% by weight, and homogenizing the cooked mixture to form a particle gel having a particle aggregate size of between about 2 and 15 microns.

28. The improved method according to claim 23 comprising, mixing a first portion of a sweetener with a stabilizer and up to about 80% by weight of hot water to provide a first mix, mixing a second portion of said sweetener with a fruit ingredient and a gel promoting agent to provide a second mix, heating said second mix to about 190° F., dispersing from 0.1% to 4.0% by weight of a pectin based fat mimetic in water, adding the dispersion to said second mix, adding said first mix to said second mix to provide a mixture thereof, cooking said mixture to a desired solids content, and then homogenizing the cooked mixture to produce a microparticulated mixture having particles between about 5 and 100 microns, said fruit ingredient constituting up to about 55% by weight of said mixture and being selected from the group consisting of fruit puree and fruit juice, said water constitutes up to about 80% by weight of said mixture, said sweetener is corn syrup and constitutes from about 10% to 75% by weight of said mixture, said stabilizer is in an amount up to about 2.0% by weight of said mixture, and said gel promoting agent being calcium chloride in an amount up to about 1.0% of said mixture.

29. The improved method according to claim 23, comprising, mixing from 20% to 75% by weight of sugar, salt, water in an amount from 25% to 80% by weight and about 2.0% by weight of an emulsifier to provide a first mix, mixing a starch based fat mimetic and starch in water to provide a solution thereof, mixing a protein based fat mimetic and from 2% to 15% by weight of cocoa with said solution to provide a second mix, adding said second mix to said first mix to provide a mixture thereof, heating said mixture to a temperature of about 210° F., and cooking said mixture to a desired solids content at a temperature of about 160° F., each said starch based and said protein based fat mimetic constituting about 0.5% to by weight of said mixture.

30. The improved method according to claim 23, comprising, blending up to 55% by weight of a fruit ingredient selected from the group consisting of fruit puree and fruit juice, up to 40% by weight of water, a sweetener in an amount from about 20% to 75% by weight, a humectant, a gel promoting agent, a food acid and a bulking agent, heating said blend to a temperature of about 160° F., dispersing a pectin based fat mimetic and a first stabilizer in water, adding the dispersion to said blend to provide a mixture thereof, cooking said mixture to a soluble solids content of from about 60% to 80% by weight, adding a second stabilizer in solution with water to said cooked mixture, said fat mimetic constituting from about 0.1% to 4.0% by weight of said mixture, and homogenizing said cooked mixture to produce a microparticulated mixture, having particles between about 5 and 100 microns.

31. The improved method according to claim 23 comprising, blending from 20% to 60% by weight of a fruit ingredient selected from the group consisting of fruit puree and fruit juice, a gel promoting agent and up to 75% by weight of a sweetener, heating said blend to a temperature of about 150° F., dispersing a pectin based fat mimetic in water, adding the dispersion to said heated blend to provide a mixture thereof, adding a stabilizer in solution with water to said mixture, cooking said mixture to a desired solids content of from 20% to 75%, said fat mimetic constituting about 0.1% to 4.0% by weight of said mixture, and then homogenizing the cooked mixture to produce a microparticulated mixture having particles between about 5 and 100 microns.

32. The improved method according to claim 23 comprising, blending up to 75% by weight of a fruit ingredient, from 10% to 80% of water, a gel promoting agent and a sweetener, heating said blend to a temperature of about 160° F., dispersing a pectin based fat mimetic in water, adding the dispersion to said heated blend to provide a mixture thereof, adding a stabilizer in solution with water to said mixture, cooking said mixture to a desired soluble solids content of from 20% to 75%, adding a food acid to said cooked mixture, said fat mimetic constituting about 0.1% to 4.0% by weight of said mixture, and then homogenizing the cooked mixture to produce a microparticulated mixture having particles between about 5 and 100 microns, said characterizing fruit ingredient being selected from the group consisting of fruit puree and fruit juice, and said sweetener being sucrose and corn syrup in an amount to provide said soluble solids content.

33. The improved method according to claim 23 comprising, mixing up to 95% by weight of water, a fruit juice concentrate and a white grape juice concentrate respectively in amounts up to about 90% and 80% by weight, and a gel promoting agent to provide a mix thereof, dispersing a pectin based fat mimetic in water and adding the dispersion to said mix to provide a mixture therewith, cooking said mixture at a temperature of about 170° F. to a soluble solids content of from 5% to 30%, said fat mimetic constituting about 0.25% to 5% by weight of said mixture, and then homogenizing the cooked mixture to produce a microparticulate mixture having particles between about 5 and 100 microns.

34. The improved method according to claim 23 comprising, mixing peppers with a first portion of water, adding salt and tomato paste concentrate to said water and peppers to provide a mix thereof, adding a second portion of water to said mix, adding tomato juice, lemon juice concentrate and a gel promoting agent to said mix, dispersing a pectin based fat mimetic in water, adding the dispersion to said mix to provide a mixture, cooking said mixture to a desired solids content, said fat mimetic constituting about 0.25% to 5% by weight of said mixture, and then homogenizing said cooked mixture to produce a microparticulate mixture having particles between about 5 and 100 microns, said tomato paste and said tomato juice being respectively in an amount of from about 5% to 30% and about 0% to 30% by weight of said mixture, said first and second portions of water together constituting from about 50% to 90% by weight of said mixture, and said cooking providing a soluble solids content of between about 5% and 30% by weight of the cooked mixture.

35. The improved method according to claim 23 comprising, mixing a first portion of water with a stabilizer, a starch based fat mimetic and a protein based fat mimetic to provide a first mix, mixing a fruit ingredient, a second portion of water and a sweetener to provide a second mix, heating said second mix, adding a preservative to said second mix during said heating, metering said first mix into said second mix during said heating to provide a mixture thereof, and cooking said mixture to a soluble solids content of from 10% to 70%, said starch based fat mimetic and said protein based fat mimetic respectively constituting from about 0.5% to 3% and from about 0.5% to 5% by weight of said mixture, said fruit ingredient constituting up to about 60% by weight of said mixture and being selected from the group consisting of whole fruit, fruit puree and fruit juice, said sweetener being sugar and constituting from about 10% to 60% by weight of said mixture, said first and second portions of water together constituting from about 40% to 80% by weight of the mixture, and said stabilizer being starch in an amount up to about 5% by weight of said mixture.

36. The improved method according to claim 23 comprising, mixing a first portion of a sweetener, a starch based fat mimetic, a protein based fat mimetic and a stabilizer to provide a first mix, mixing a second portion of said sweetener and water to provide a second mix, heating said second mix to a temperature of about 160° F., metering said first mix into said heated second mix to provide a mixture thereof, cooking the mixture to a soluble solids content of from 10% to 80%, and adding a flavoring to said mixture after cooking, said starch based fat mimetic and said protein based fat mimetic respectively constituting from about 0.25% to 4% and from about 0.25% to 5% by weight of said mixture, said sweetener being corn syrup and first and second portions thereof together constituting from about 10% to 80% by weight of said mixture, said water constituting from about 20% to 85% by weight of said mixture, and said stabilizer being in an amount up to about 0.5% by weight of the mixture.

37. The improved method according to claim 23 comprising, mixing water, vinegar, sugar, salt, chili powder, a starch based fat mimetic, a protein based fat mimetic and a stabilizer to provide a mix thereof, adding whole tomato pieces, tomato paste, tomato sauce, pepper pieces and onion pieces to said mix to provide a mixture therewith, and cooking said mixture at a temperature of about 200° F., said starch based fat mimetic and said protein based fat mimetic respectively constituting from about 0.25% to 4% and from about 0.25% to 6% by weight of the mixture, said tomato pieces and said tomato paste together constituting up to about 40% by weight of said mixture, said tomato sauce constituting up to about 30% by weight of said mixture, said peppers constituting up to about 20% by weight of said mixture, said onions constituting up to about 15% by weight of said mixture, said water constituting from about 20% to 80% by weight of said mixture, and said stabilizer being starch in an amount up to about 5% by weight of said mixture.

\* \* \* \* \*